US008879292B2

(12) United States Patent
Jakob et al.

(10) Patent No.: US 8,879,292 B2
(45) Date of Patent: Nov. 4, 2014

(54) MULTIPOINT CONVERTERS WITH BRAKE CHOPPER

(71) Applicant: GE Energy Power Conversion GmbH, Berlin (DE)

(72) Inventors: Roland Jakob, Berlin (DE); Thomas Brückner, München (DE)

(73) Assignee: GE Energy Power Conversion GmbH, Berlin (DE)

( * ) Notice: Subject to any disclaimer, the term of this patent is extended or adjusted under 35 U.S.C. 154(b) by 0 days.

(21) Appl. No.: 13/681,671

(22) Filed: Nov. 20, 2012

(65) Prior Publication Data

US 2013/0215658 A1    Aug. 22, 2013

(30) Foreign Application Priority Data

Nov. 25, 2011  (DE) .......................... 10 2011 087 151

(51) Int. Cl.
*H02M 7/5387* (2007.01)
*H02M 7/217* (2006.01)
*H02P 3/22* (2006.01)
*H02M 7/219* (2006.01)
*H02M 7/483* (2007.01)

(52) U.S. Cl.
CPC .................. *H02M 7/217* (2013.01); *H02P 3/22* (2013.01); *H02M 7/219* (2013.01); *H02M 7/483* (2013.01)
USPC ........... 363/132; 363/135; 363/55; 363/56.02

(58) Field of Classification Search
USPC ............. 363/40, 55, 56.01, 56.02, 58, 71, 72, 363/120, 123, 124, 131, 132, 135, 136, 137
See application file for complete search history.

(56) References Cited

U.S. PATENT DOCUMENTS

| 4,405,977 A | | 9/1983 | Bhagwat et al. |
| 5,481,448 A | * | 1/1996 | Nakata et al. .................. 363/137 |
| 8,054,657 B2 | | 11/2011 | Gruber et al. |
| 8,278,927 B2 | * | 10/2012 | Venkatesa ...................... 324/322 |
| 2013/0100720 A1 | * | 4/2013 | Holliday et al. ............ 363/56.11 |

OTHER PUBLICATIONS

German Patent Office Search Report, Dec. 5, 2012.

\* cited by examiner

*Primary Examiner* — Nguyen Tran
(74) *Attorney, Agent, or Firm* — Parks IP Law; Theodore A. Wood (57) ABSTRACT

An electrical circuit for a power converter is described. The circuit has been provided with several semiconductor switches and capacitors used for operating the power converter. A brake resistance for lowering energy is provided and is connected to the semiconductor switches provided without the need for an additional switch. The operation of the power converter and the current flowing through the brake resistance can be controlled by means of the existing semiconductor switches.

11 Claims, 7 Drawing Sheets

MULTIPOINT CONVERTERS WITH BRAKE CHOPPER

FIELD OF THE INVENTION

The present invention generally refers to an electrical circuit for a power converter. More specifically, the present invention relates to an electrical circuit that facilitates the prevention or reduction of excess voltage within a power converter.

BACKGROUND OF THE INVENTION

With power converters, it may become necessary to convert excess energy into heat. There can be many situations where this is necessary. For example, an energy source (such as a wind power station) may be connected to a power converter to supply energy to the power converter. However, an energy sink connected to the power converter may be unable to take up excess energy (e.g. a power supply grid in case of a short circuit) or that the power converter may be incapable of feeding energy back into the grid because of its design. In power converters with a voltage source inverter, this could lead to an excessive increase of the voltage source and thus, the power must be lowered.

It is also possible for multi-point power converters under certain operating conditions (depending on load, control system and design) to develop non-symmetric voltages in the capacitors that are connected in series of a voltage source inverter. In this case, it may also become necessary to convert energy into heat. Furthermore, there may also be other operational reasons for lowering voltages in intermediate circuit capacitors at a certain point in time and to convert the energy stored in them into heat.

The task to convert excess energy into heat is typically taken up by brake choppers. Generally, brake choppers include a power semiconductor switch that can be turned off and a power resistance that is connected to DC voltage connections of a voltage inverter. There have been some attempts aimed at lowering the cost of semiconductor switches for the brake chopper circuit. For example, various circuits may be connected to the output of a voltage inverter and therefore can operate with semiconductor switches that cannot be turned off as long as DC voltage is applied at the power converter output. Other methods suggest a circuit that is connected in parallel to a semiconductor switch of a voltage inverter that is capable of operating with semiconductor switches that cannot be turned off. Other attempts suggest supplementing the actual three-phase inverter with brake resistances and to operate it as brake chopper.

One conventional brake chopper has a modular design with distributed brake resistances. By allocating the brake resistance to a power electronics module, it is possible to achieve a modular structure and distribute the braking performance into several such modules. However, semiconductor switches are generally necessary for controlling the brake chopper circuit which is needed in addition to the semiconductor switches in the power converter in order to ensure the functioning of the brake chopper. As a result, the prevention or reduction of the excess voltage adds complexity to the circuitry and increases costs. Therefore, an improved electrical circuit that facilitates the prevention or reduction of excess voltage within a power converter would be useful.

BRIEF DESCRIPTION OF THE INVENTION

Aspects and advantages of the invention are set forth below in the following description, or may be obvious from the description, or may be learned through practice of the invention.

One embodiment of the present invention is an electrical circuit for a power converter. The power converter includes two parallel circuit structures. Each parallel circuit structure includes at least one semiconductor switch, at least one connection node and at least one energy storage device. A brake resistance is disposed between the connection nodes of the two parallel circuit structures. The brake resistance is connected to the semiconductor switch of each parallel circuit structure at a respective connection points such that operation of the power converter controls a current flowing through the brake resistance.

Another embodiment of the present invention is a method for operating an electrical circuit to control operation of a power converter such that operation of the power converter controls a current flowing through a brake resistance within the electrical circuit. The power converter includes two parallel circuit structures. Each parallel circuit structure includes at least one semiconductor switch, at least one connection node and at least one energy storage device. A brake resistance is switched in an open position and disposed between the connection nodes of the two parallel circuit structures. The brake resistance is connected to the semiconductor switch of each parallel circuit structure at respective connection points. The method includes applying power to the brake resistance and reducing the power in the brake resistance via redundant switching states provided within the parallel circuit structures.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1A:
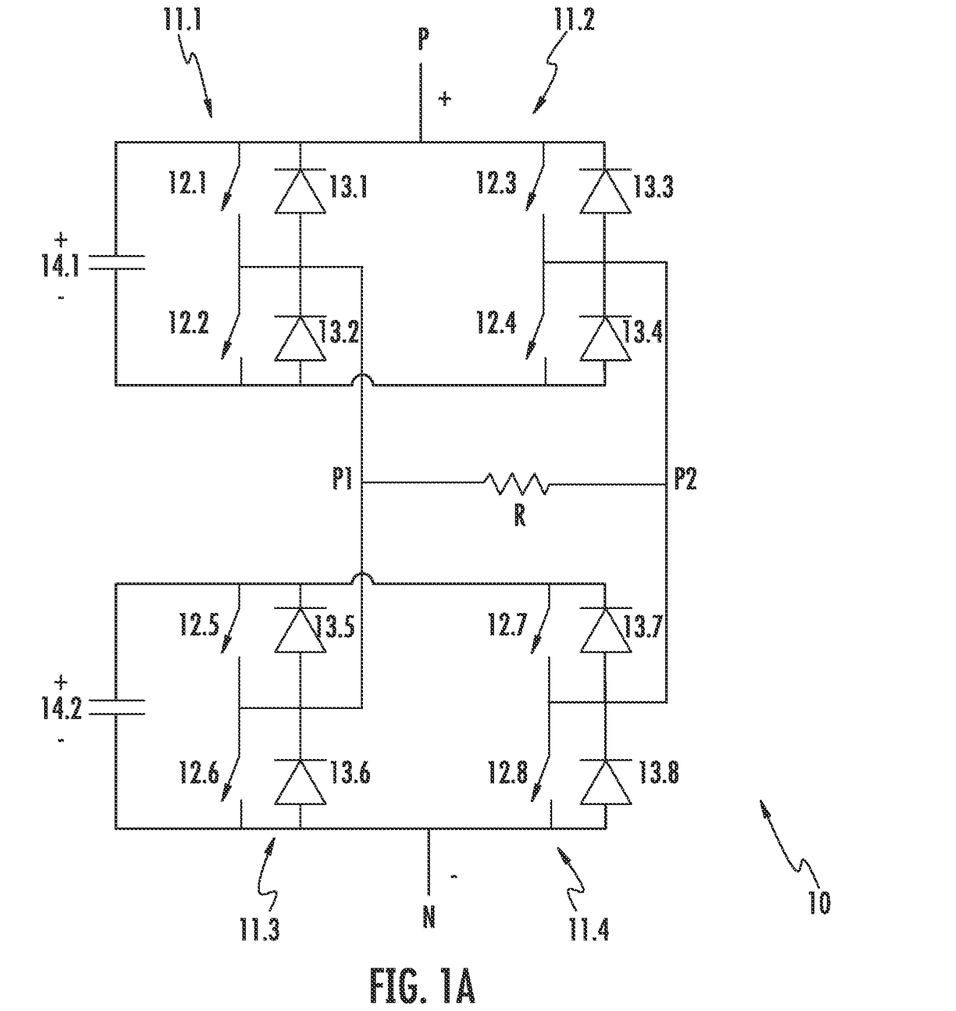
FIG. 1A provides a schematic of a wiring diagram of power converter subsystems for use in a power converter, according to one embodiment of the invention.
Figure 1B:
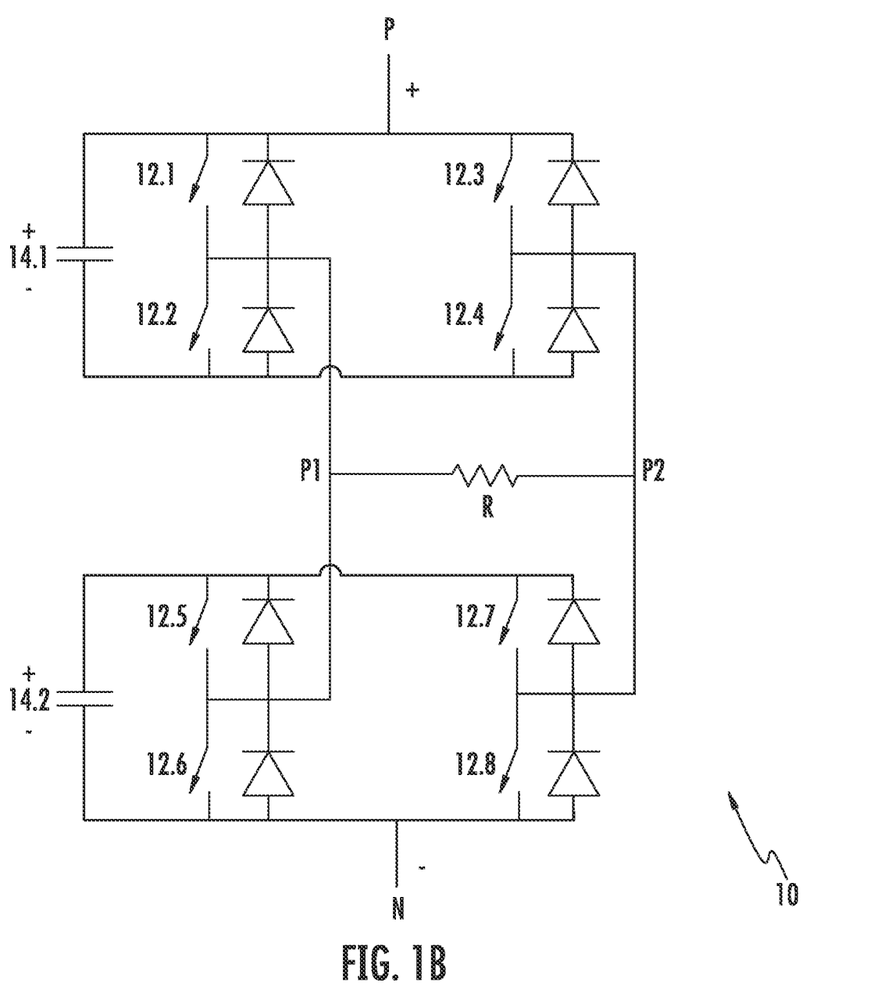
FIG. 1B provides a schematic of a wiring diagram of power converter subsystems for use in a power converter, according to one embodiment of the invention.
Figure 2:
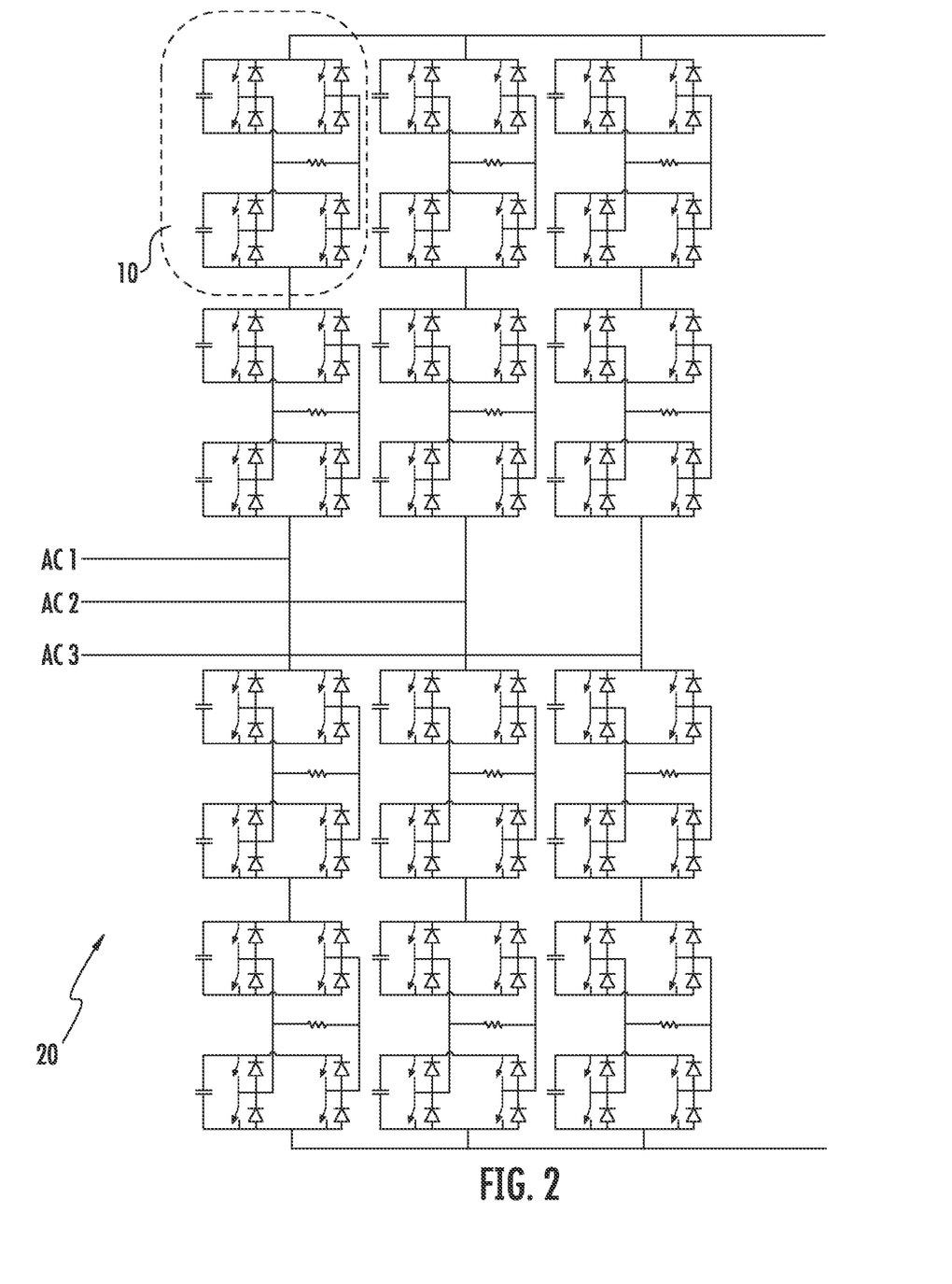
FIG. 2 provides a schematic wiring diagram of a three-phase power converter according to one embodiment of the invention.

FIG. 2 shows a three-phase representation of a modular multi-point power converter 20. This type of multi-point power converter is also known as modular multilevel converter (M2C). In one embodiment, every one of the three phases of the power converter 20 consists of two parallel circuit structures. Furthermore, every one of the three phases is made up of a number of power converter subsystems 10. In this embodiment each of the three phases consists of four power converter subsystems 10 per phase. One of these power converter subsystems will be explained in more detail below with the help of FIGS. 1A and 1B.

In one embodiment, as shown in FIGS. 1A and 1B, the power converter subsystems 10 contain the parallel circuit structures. The semiconductor switches of every power converter subsystem and all power converter subsystems jointly serve for controlling the operation of the power converter 20. The semiconductor switches of every single power converter subsystem 21 serve simultaneously and independently from the other power converter subsystems 10 for controlling a brake chopper function by means of the brake resistance located in the respective power converter subsystem. The control of the semiconductor switches of a power converter subsystem 10 for implementing the brake chopper function is also described in more detail with the help of FIGS. 1A and 1B.

FIGS. 1A and 1B show a power converter subsystem 10 that can be used in the power converter 20 of FIG. 2. The power converter subsystem 10 consists of four modules 11.1, 11.2, 11.3 and 11.4. Every one of the modules has two semiconductor switches connected in series and two diodes connected in series in opposite direction to the semiconductor switches. Both connections in series are connected parallel to one another. The connection points of the two semiconductor switches and of both diodes are linked to one another and constitute an AC voltage connection of the respective module. A capacitor has been connected parallel to the two connections in series. The two connections of the capacitor constitute a positive and a negative connection of the respective module.

In the power converter subsystem 10 of FIGS. 1A and 1B, the two modules 11.1 and 11.2 as well as the two modules 11.3 and 11.4 are in each case connected parallel to one another. Furthermore, the AC voltage connections of the two modules 11.1 and 11.3 as well as the AC voltage connections of the two modules 11.2 and 11.4 are connected to one another, in which case the resulting terminals are identified as connection points P1, P2. The positive terminals of the two modules 11.1 and 11.2 constitute a connection point P of the power converter subsystem 10 and the negative terminals of the two modules 11.3 and 11.4 constitute a connection point N of the power converter subsystem 10. The semiconductor switches, diodes and capacitors of the four modules have been numbered consecutively. To be more precise, the semiconductor switches 12.1, 12.2, 12.3, 12.4, 12.5, 12.6, 12.7, 12.8, the diodes 13.1, 13.2, 13.3, 13.4, 13.5, 13.6, 13.7, 13.8 and the capacitors 14.1 and 14.2 are provided.

With regard to the capacitors of the four modules, it must be pointed out that the two capacitors of both modules 11.1 and 11.2 as well as the two capacitors of both modules 11.3 and 11.4 are in each case combined in the capacitors 14.1 and 14.2 as shown in the figure. In practice, however, the capacitors can be executed separately for each module or combined for all modules connected in parallel. The AC voltage connections of the modules are connected in series can be linked to one another through inductances if necessary. A brake resistance R has been connected between the two connecting points P1, P2.

As already mentioned, four power converter subsystems 10 are connected in series for every phase in the power converter 20 of FIG. 2. The power converter subsystems 10 of the three phases are connected parallel to one another. The connection points P and N of the two outermost power converter subsystems 10 of the three connections in series connected in parallel constitute the DC voltage connections +, − of the power converter 20. The respective connection points of the two middle power converter subsystems 10 of the three connections in series constitute the AC voltage connections AC1, AC2, AC3 of the power converter 20.

When the power converter 20 operates normally, the two modules 11.1 and 11.2 connected in parallel and the two modules 11.3 and 11.4 connected in parallel in the power converter subsystems 10 are in each case controlled in the same way. If, for example, the voltage of the capacitor 14.2 between connection points P and N of the power converter subsystem 10 should be connected, then the semiconductor switches 12.1, 12.3., 12.5 and 12.7 are conductively connected and the other semiconductor switches blocked. Further options may include switching the voltage of capacitor 14.1 between connection points P and N of the power converter subsystem 10, to switch the sum of the voltage of capacitors 14.1 and 14.2 between connection points P and N or to connect connection points P and N with one another.

FIG. 1A shows the control of the semiconductor switches mentioned first with solid lines in the respectively switched and conducting semiconductor switches. Owing to the similar control of the semiconductor switches during normal operation, the same potentials are applied on both connection points P1, P2, so that during normal operation no voltage drops on the brake resistance R. For example, for reducing or preventing excess voltages in capacitors 14.1 and 14.2, the semiconductor switches can also be controlled in a different way, as shown in FIG. 1B.

In one embodiment, according to FIG. 1B, the semiconductor switches 12.1, 12.4, 12.5 and 12.8 are switched to conduct and the other semiconductor switches are blocked. Provided that the voltages on capacitors 14.1 and 14.2 are equally large, the voltage of capacitors 14.1 and 14.2 is switched with them in parallel between connection points P and N of the power converter subsystem 10. In addition, connection point P1 is connected to the positive connections of both capacitors 14.1 and 14.2 via the semiconductor switches 12.1 and 12.5, and connection point P2 is connected to the negative connections of the two capacitors 14.1 and 14.2 via the semiconductor switches 12.4 and 12.8.

As previously disclosed, the brake resistance R is wired between the two connection points P1 and P2. Since the connection points P1, P2 are connected to the positive and negative connections of both capacitors 14.1 and 14.2, the brake resistance R is in each case wired parallel to the two capacitors 14.1 and 14.2. As a result of this, the capacitors 14.1 and 14.2 can discharge via the brake resistance R in the different control of the semiconductor switches explained according to FIG. 1B above. For example, an excess voltage present in capacitors 14.1 and 14.2 can thus be reduced via the brake resistance R.

Regarding the voltage applied on connection points P and N, the power converter subsystem 10 in this switching state behaves exactly as in the one described above, in which no voltage is applied on the brake resistance R. It is therefore a redundant switching state that behaves in the same way with regard to the normal operation of the power converter subsystem 10. However, in the different operation shown in FIG. 1B, a voltage has been applied on brake resistance R, whereas this is not the case in the normal operation shown in FIG. 1A. Power can therefore be transformed in the brake resistance R depending on the requirements of the operating state of the power converter. Additional switchable components are not necessary for this. This is generally achieved by designing the power converter subsystem 10 with the help of semiconductor switches and by wiring at least one brake resistance in such a way in the electrical circuit of the power converter subsystem 10 that a current flowing through this brake resistance is influenced only by the existing semiconductor switches of the power converter subsystem 10, i.e. without needing an additional switch to accomplish this.

It is obvious that the different control of the semiconductor switches can also be done precisely in reverse from FIG. 1B, for example, by switching the semiconductor switches 12.2, 12.3, 12.6 and 12.7 so they conduct and block the other semiconductor switches. The different control of the semiconductor switches explained with the help of FIG. 1B can be carried out as part of a time share percentage compared to normal operation. In this way, power, which with the help of differently controlled semiconductor switches in the brake resistance R can be transformed into heat, can be influenced and thus reduced.

Figure 3A:
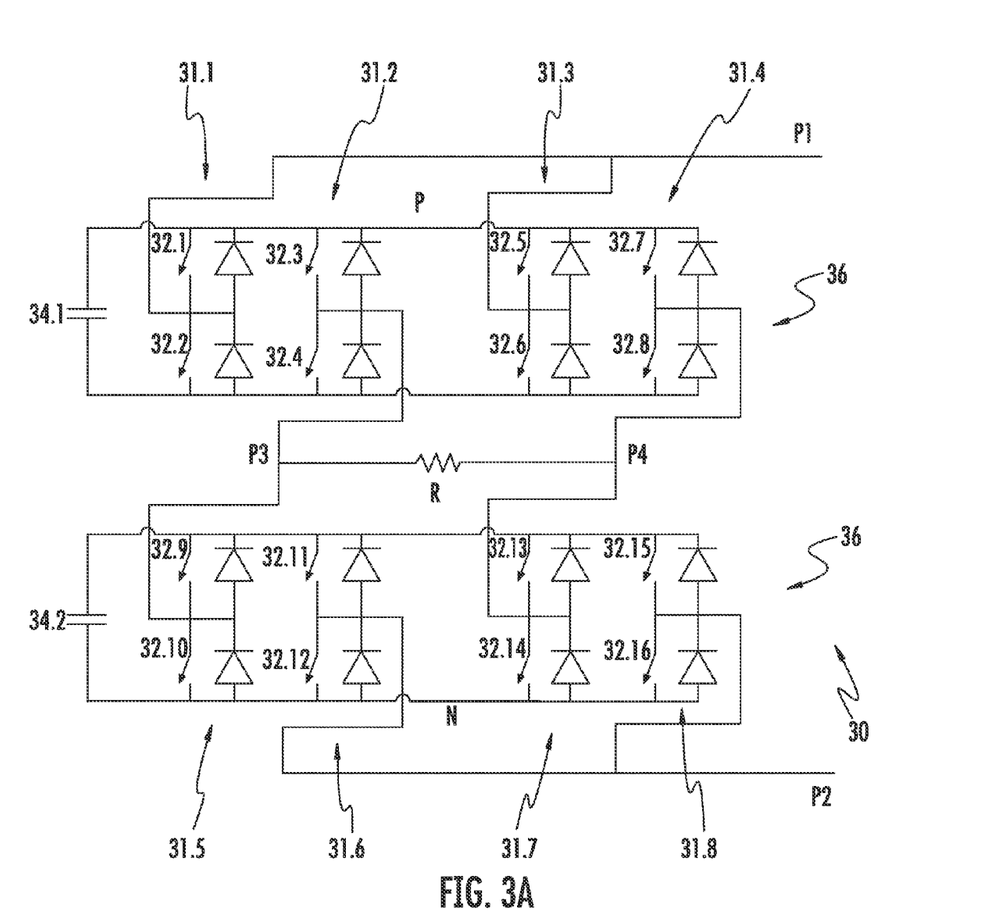
FIG. 3A provides a schematic wiring diagram of an electrical circuit for a power converter branch including parallel circuit structures according to one embodiment of the present invention.
Figure 3B:
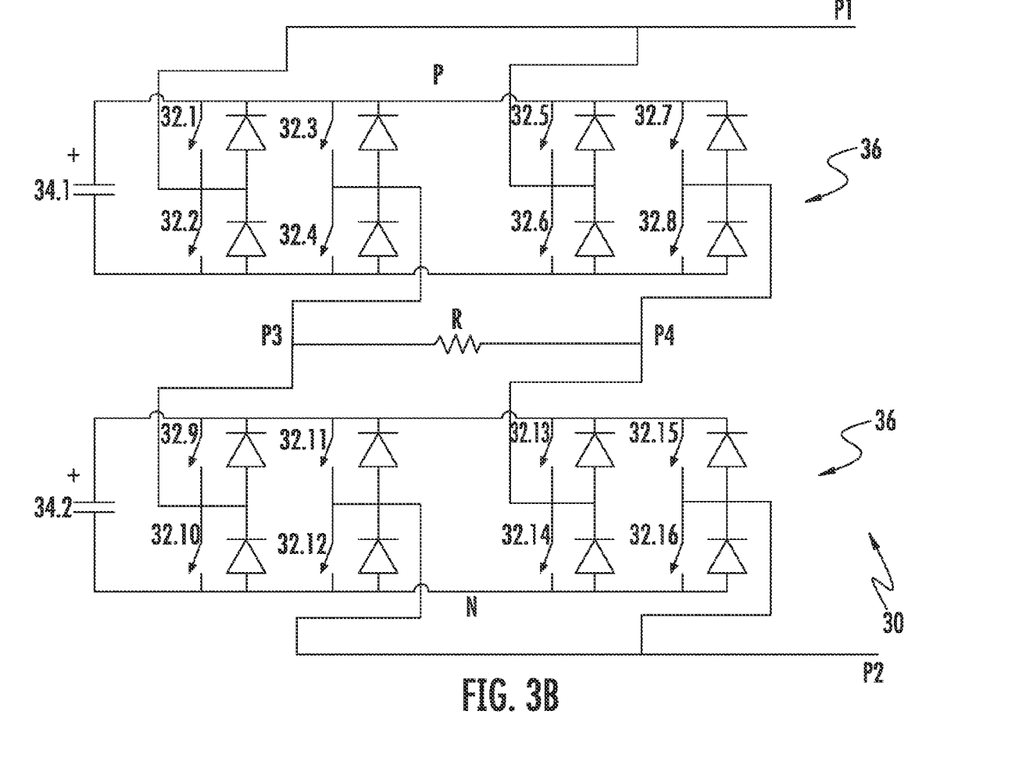
FIG. 3B provides a schematic wiring diagram of an electrical circuit for a power converter branch including parallel circuit structures according to one embodiment of the present invention.

FIGS. 3A and 3B show a one-phase representation of a power converter 30 with parallel circuit structures. The wiring shown in FIGS. 3A and 3B can also be understood as a power converter subsystem 30 and used in a modular multi-point power converter 20 in accordance with FIG. 2 instead of the power converter subsystem 10. In the power converter 30 or power converter subsystem 30 according to FIGS. 3A and 3B, the DC voltage of the capacitors 34.1 and 34.2 is converted to a DC voltage or to an AC voltage in connection points P1 and P2. The power supply to the capacitors 34.1 and 34.2 is not shown.

Figure 4:
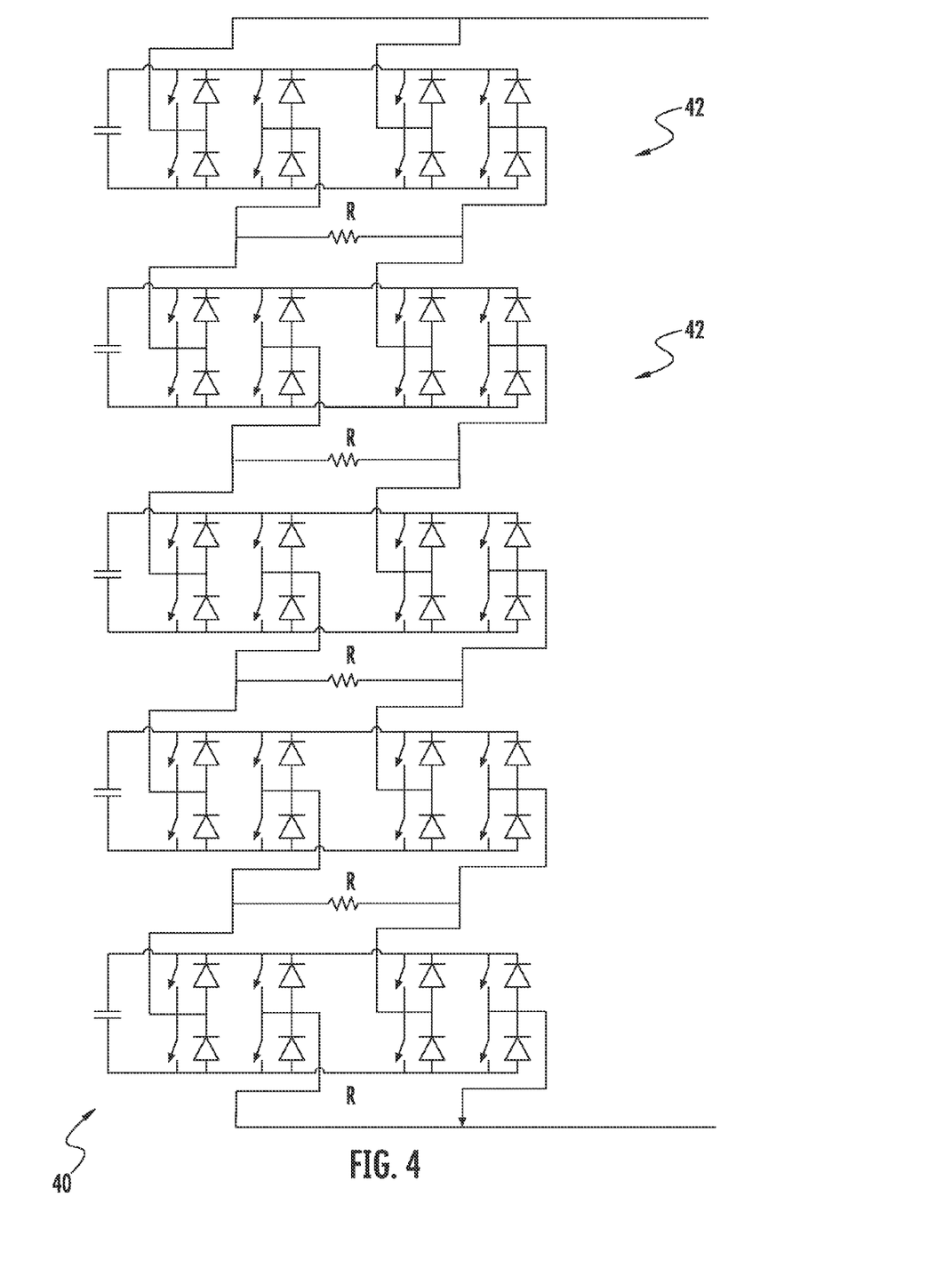
FIG. 4 provides a schematic wiring diagram of an electrical circuit for a power converter branch according to one embodiment of the present invention.

FIGS. 3A and 3B show the simplest case of two so-called H bridges 36 connected in series. It should be obvious to one of ordinary skill that the circuit can be expanded by any number of H bridges 36 connected in series. This will be explained with the help of FIG. 4. In one embodiment, the power converter 30 of FIGS. 3A and 3B consists of eight modules 31.1, 31.2, 31.3, 31.4, 31.5, 31.6, 31.7 and 31.8. In every one of the modules, two semiconductor switches have been connected in series and two diodes have been connected in series in opposite direction to the semiconductor switches. Both connections in series are connected parallel to one another. The connection points of the two semiconductor switches and of the two diodes are connected to one another and constitute the respective module's AC voltage connection. A capacitor has been connected parallel to both connections in series. The two capacitor connections form the respective module's positive and negative DC voltage connection.

In the power converter 30 of FIGS. 3A and 3B, the modules 31.1, 31.2, 31.3, 31.4 and the modules 31.5, 31.6, 31.7 and 31.8 are in each case connected parallel to one another. Furthermore, the AC voltage connections of modules 31.1 and 31.3 or 31.6 and 3.8 or 31.2 and 31.5 or 31.4 and 31.7 are linked to one another, in which case the resulting linking points are identified as connection points P1, P2, P3, P4. The semiconductor switches and capacitors of the eight modules are numbered consecutively as follows: semiconductor switches 32.1, 32.2., 32.3, 32.4, 32.5, 42.6, 32.7, 32.8, 32.9, 32.10, 32.11, 32.12, 32.13, 32.14, 32.15 and 32.16 as well as capacitors 34.1 and 34.2 are used. The diodes are not identified in more detail.

Regarding the capacitors of the eight modules, it is pointed out that the capacitors of modules 31.1, 32.2, 32.3, and 31.4 as well as the four capacitors of modules 31.5, 31.6, 31.7, and 31.8 are in each case combined with the capacitors 34.1 and 34.2 shown. In practice, the capacitors can be separately executed for each module or combined for all modules connected in parallel. The AC voltage connections of the modules connected in series can, if necessary, be connected to one another through inductances.

It is additionally pointed out that the positive and negative connection points of capacitors 34.1 and 34.2 represent the input-side DC voltage connections of power converter 30, but their supply is not shown in detail. It is also pointed out that the feedings of capacitors 34.1 and 34.2 must take place in each case through electrical isolation. Whether an input-side feeding into the connection points of capacitors 34.1 and 34.2 is required for the operation of the circuit 30 depends on the way in which the circuit 30 is employed, e.g. as power converter sub-system within a power converter 20 or as part of a power converter 50 in accordance with FIG. 5 to be explained below. A brake resistance R has been connected between both connection points P3 and P4. When the power converter 30 is operating normally, the two modules 31.1 and 31.3 as well as the two modules 31.2 and 31.4 and the two modules 31.6 and 31.8 are in each case controlled in the same way.

In an exemplary switching state of normal operation (shown in FIG. 3A with solid lines in the conductively connected semiconductor switches), the semiconductor switches 32.1, 32.3, 32.5, 32.7, 32.9, 32.11, 32.13 and 32.15 are conductively switched on, and all other semiconductor switches blocked. In this switching state, the voltage applied between connections P1 and P2 equals zero. Owing to the same type of control of the semiconductor switches during normal operation, the same potentials are applied on both connection points P3 and P4, so that no voltage drops on the brake resistance R.

It is pointed out that apart from the exemplary switching state described above for a normal operation of the power converter 30, other switching states exist for normal operation in which no voltage drops at the brake resistance R. For example, the semiconductor switches can also be controlled in a different way for lowering or preventing excess voltage on the capacitors 31.1 and 34.2 or for other reasons. This is shown in FIG. 3B.

In one embodiment, according to FIG. 3B, the semiconductor switches 32.1, 32.3, 32.5, 32.8, 32.9, 32.11, 32.14 and 32.15 are conductively switched on and the other semiconductor switches blocked. It is assumed here that the voltages on the capacitors 34.1 and 34.2 are equally large. This means that the connection point P3 is connected to the positive connections of the two capacitors 34.1 and 34.2 through semiconductor switches 32.3 and 32.9. Accordingly, the connection point P4 is connected to the negative connections of the two capacitors 34.1 and 34.2 through the semiconductor switches 32.8 and 32.14. Furthermore, as in normal operation, an output voltage amounting to zero is applied between connection points P1 and P2.

As has already been explained, the brake resistance R is connected between the two connection points P3 and P4. Since the connection points P3 and P4 are connected to the positive and negative connections of the two capacitors 34.1 and 34.2, the brake resistance R is in each case connected parallel to the two capacitors 34.1 and 34.2. As a result, in the redundant control of the semiconductor switches according to FIG. 3B explained above, the capacitors 34.1 and 34.2 can discharge through the brake resistance R. For example, an excess voltage present in capacitors 34.1 and 34.2 can therefore be lowered through the brake resistance R. As a result of that, power can be converted in the brake resistance R. Additional switchable components are not necessary for this. Therefore, the power converter 30—which has been built with the help of semiconductor switches—is used, and at least one brake resistance is interconnected in such a way in the electrical circuit of the power converter 30 that a current flowing through this brake resistance is influenced only by the semiconductor switches of the power converter 30 that are present—i.e., without having to use an additional switch for this. It is pointed out that the available redundant states can be used with the same output voltage between connection points P1 and P2 for all possible switching states in order to apply or not apply a voltage on the brake resistance R depending on the requirements of the power converter's operating state.

It should be obvious to one of ordinary skill that the individual semiconductor switches can also be executed as switch modules in which several semiconductor switches are switched on in series and/or parallel. The same also applies to the diodes. It is likewise obvious that the individual capacitors can also be executed as capacitor banks in which several semiconductor switches are switched on in series and/or parallel. Furthermore, the capacitors of the individual modules or several modules can be combined in a capacitor bank.

The power converter 30 according to FIGS. 3A and 3B—in which two H bridges 36 are connected in series—can be expanded into any number of such H bridges connected in series. Thus, as in the example of FIG. 4, a one-phase power converter branch 40 with five H bridges 42 connected in series is shown. Between the two connection points of two adjacent H bridges 42, a brake resistance R has been connected in each case. The control of the brake chopper function with the help of this brake resistance R takes place analogously in the manner described with the help of FIGS. 3A and 3B.

Figure 5:
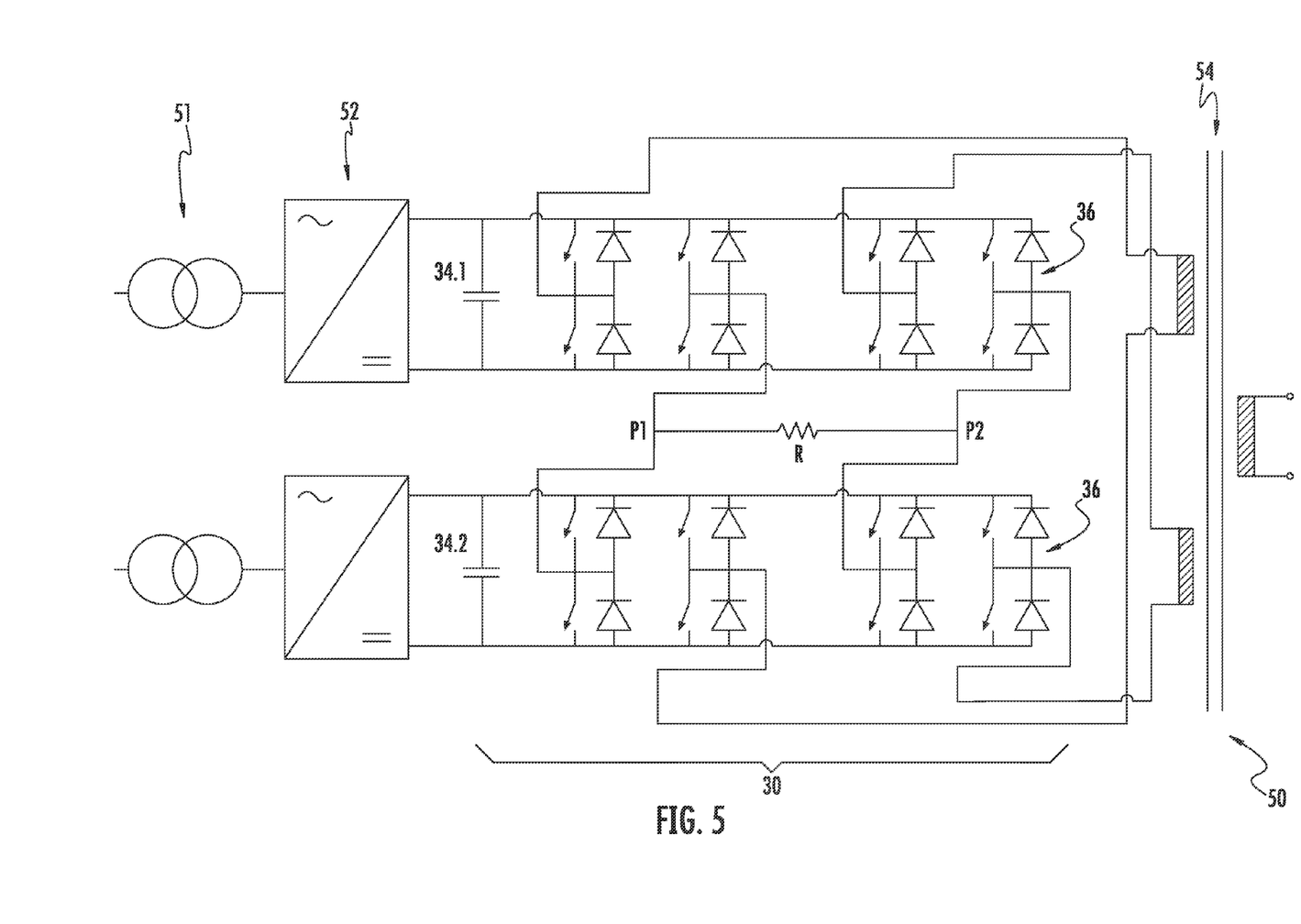
FIG. 5 provides a schematic wiring diagram of an electrical circuit as shown in FIGS. 3A and 3B, according one embodiment of the present invention.

FIG. 5 shows the use of the switch of FIGS. 3A and 3B as a power converter subsystem 30 in a one-phase power converter 50. As shown in FIG. 5, the feeding into both capacitors 34.1 and 34.2 takes place in an electrically isolated way through input-side transformers 51 and rectifiers 52. In this embodiment, the outer output terminals of the two H bridges are not combined in each case into one connection P1 and P2 as in FIGS. 3A and 3B, but connected to isolated windings of an output-side transformer 54. Regarding the corresponding control of all semiconductor switches of the power converter 50, a DC voltage or an AC voltage can be generated in the output terminals of the transformer 54. The control of the brake chopper function takes place independently in the manner described in FIGS. 3A and 3B. As a result, a multi-phase power converter can be built and operated analogously.

The different or redundant control of the semiconductor switches of the power converters or power converter subsystems 10, 20, 30, 40, 50 explained above cannot just be employed to prevent or reduce a DC voltage increase in the capacitors under operation with generators, but that this different type of control can be employed very generally for influencing the voltage on the capacitors also in other operational states of the power converter or power converter sub-system 10, 20, 30, 40, 50. In particular, the different type of control can be employed for reducing the voltage on the capacitors when power is fed into the AC voltage-side connection points of the power converter or power converter sub-system 10, 20, 30, 40, 50.

The power converters 20, 40, 50 according to the invention do not necessarily have to be built from power converter sub-systems and the power converter sub-systems 10, 30 do not necessarily have to be built from modules, as described in the examples shown in the figures. Rather, the parallel circuit structures can also be done without a modular design or parts other than the ones indicated can be combined to power converter sub-systems or modules in order to connect brake resistances within or outside power converter sub-systems and modules to the nodes of the parallel circuit structures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An electrical circuit for a power converter, comprising:
two parallel circuit structures, each having at least one semiconductor switch, at least one connection node, and at least one energy storage device; and
a brake resistance device disposed between the connection nodes of the two parallel circuit structures;
wherein the brake resistance device is connected to the semiconductor switch of each parallel circuit structure at respective connection points such that operation of the power converter controls a current flowing through the brake resistance device; and
wherein the power converter further comprises first and second modules (i) connected in parallel, (ii) respectively connected to the first and second connection points and (iii) interconnected with the semiconductor switches and the energy storing devices.

2. The electrical circuit in claim 1,
wherein the semiconductor switches of each of the two parallel circuit structures are configured similarly for controlling operation of the power converter during normal operation and the semiconductor switches, of at least of one of the parallel circuit structures are configured differently for controlling the current flowing through the brake resistance device during non-normal operation of the power converter.

3. The electrical circuit in claim 2, wherein the connection points to which the brake resistance device is connected have the same potential during normal operation of the power converter.

4. The electrical circuit in claim 2, wherein the two connection points to which the brake resistance device is connected have dissimilar potentials during non-normal operation of the power converter.

5. The electrical circuit in claim 1, wherein the electrical circuit is configured such that the application of a voltage to the brake resistance device does not influence the potential steps on outer AC voltage connections of the power converter.

6. The electrical circuit in claim 1, further comprising:
four modules, each module having two semiconductor switches or switching modules connected in series and capacitor or capacitor bank connected in parallel, two of the modules being connected in parallel and two of the modules being connected non-parallel; and
wherein connection points of the semiconductor switches or switching modules of the two modules connected non-parallel each constitute a brake resistance device connected between connection points of the semiconductor switches or switching modules of the two modules not connected in parallel.

7. The electrical circuit in claim 1, further comprising:
eight modules each module having two semiconductors or two switching modules connected in series and a capacitor or capacitor bank connected parallel to the semiconductors or two switching modules four of the modules being connected in parallel and four of the modules being connected non-parallel;

wherein connection points of the semiconductor switches or switching modules of two of the four modules connected in parallel individually constitute a connection point and connection points of the semiconductor switches or switching modules of two of the four modules that are connected non parallel individually constitute connection point; and wherein brake resistance device is connected between the individual connection points of the semiconductor switches or switching modules of the two modules of the four modules that are connected non-parallel.

8. A method for operating an electrical circuit to control operation of a power converter such that operation of the power converter controls a current flowing through a brake resistance device within the electrical circuit the power converter having two parallel circuit structures, each parallel circuit structure having at least one semiconductor switch and at least one connection node, at least one energy storage device, the brake resistance device being configured for switching to an open position and disposed between the connection nodes of the two parallel circuit structures, the brake resistance device being connected to the semiconductor switch of each parallel circuit structure at respective connection points, the method comprising:

applying power to the brake resistance device; and reducing the power in the brake resistance device via redundant switching states provided within the parallel circuit structures, wherein the electrical circuit includes four modules, each module having two semiconductor switches or switching modules connected in series and a capacitor or capacitor bank connected in parallel two of the modules being connected in parallel and two of the modules being connected non-parallel, the method further comprising, operating the semiconductor switches or switching modules of the modules connected in parallel similarly during normal operation of the power converter.

9. A method for operating an electrical circuit to control operation of a power converter such that operation of the power converter controls a current flowing through a brake resistance device within the electrical circuit the power converter having two parallel circuit structures, each parallel circuit structure having at least one semiconductor switch and at least one connection node, at least one energy storage device, the brake resistance device being configured for switching to an open position and disposed between the connection nodes of the two parallel circuit structures, the brake resistance device being connected to the semiconductor switch of each parallel circuit structure at respective connection points, the method comprising:

applying power to the brake resistance device; and reducing the power in the brake resistance device via redundant switching states provided within the parallel circuit structures, wherein the electrical circuit includes four modules, each module having two semiconductor switches or switching modules connected in series and a capacitor or capacitor bank connected in parallel, two of the modules being connected in parallel and two of the modules being connected non-parallel, the method further comprising operating the semiconductor switches or switching modules of the two modules that are connected in parallel in one operational state during normal operation of the power converter and operating semiconductor switches or switching modules of the two modules connected non-parallel in another operational state during non-normal operation of the power converter.

10. The method in claim 8, further comprising operating semiconductor switches or switching modules of a maximum of six modules of the electric circuit in one operational state during normal operation of the power converter and operating the semiconductor switches or switching modules of at least two other modules of the electrical circuit in another operational state during non-normal operation of the power converter.

11. The method in claim 9, further comprising operating semiconductor switches or switching modules of a maximum of six modules of the electric circuit in one operational state during normal operation of the power converter and operating the semiconductor switches or switching modules of at least two other modules of the electrical circuit in another operational state during non-normal operation of the power converter.

* * * * *